(12) United States Patent
Chen

(10) Patent No.: US 7,554,949 B2
(45) Date of Patent: Jun. 30, 2009

(54) FILTERING DATA PACKETS AT A NETWORK GATEWAY WORKING AS A SERVICE-BASED POLICY (SBLP) ENFORCEMENT POINT

(75) Inventor: Xiaobao Chen, Swindon (GB)

(73) Assignee: Orange S.A., Paris (FR)

( * ) Notice: Subject to any disclaimer, the term of this patent is extended or adjusted under 35 U.S.C. 154(b) by 434 days.

(21) Appl. No.: 10/534,662

(22) PCT Filed: Nov. 7, 2003

(86) PCT No.: PCT/GB03/04812

§ 371 (c)(1),
(2), (4) Date: Nov. 22, 2005

(87) PCT Pub. No.: WO2004/045159

PCT Pub. Date: May 27, 2004

(65) Prior Publication Data

US 2006/0104284 A1    May 18, 2006

(30) Foreign Application Priority Data

Nov. 11, 2002   (GB)   ................... 0226289.7

(51) Int. Cl.
*H04Q 7/24* (2006.01)
*H04L 12/56* (2006.01)
*H04L 12/28* (2006.01)

(52) U.S. Cl. ............... 370/331; 370/389; 370/401; 370/338

(58) Field of Classification Search ........... 370/389, 370/392, 338, 331, 400, 401, 390, 432, 351, 370/349, 352, 524, 332, 321, 342
See application file for complete search history.

(56) References Cited

U.S. PATENT DOCUMENTS

| 6,636,498 | B1 * | 10/2003 | Leung ................ 370/338 |
| 6,915,325 | B1 * | 7/2005 | Lee et al. ............. 709/202 |
| 6,973,086 | B2 * | 12/2005 | Patil et al. ............ 370/392 |
| 7,123,599 | B2 * | 10/2006 | Yano et al. ............ 370/331 |
| 7,272,148 | B2 * | 9/2007 | Zhang et al. .......... 370/401 |

(Continued)

FOREIGN PATENT DOCUMENTS

CA      2308697 A     11/2001

(Continued)

OTHER PUBLICATIONS

UMTS, "End to End Quality of Service Concept and Architecture TS 23.207 v 5.4.0 Release 5", ETSI TS 123 207 V5.4.0, Jun. 2002, pp. 1-49, XP002256017, pp. 12-13, paragraph 5.2.1.

(Continued)

*Primary Examiner*—Edan Orgad
*Assistant Examiner*—Chuong T Ho
(74) *Attorney, Agent, or Firm*—Knobbe, Martens, Olson & Bear LLP

(57) ABSTRACT

A method of filtering data packets at a network gateway is disclosed. The data packets have a header including a destination address and an extension header, and the method includes selectively blocking ones of the data packets where neither the destination address nor the extension header matches a predetermined criterion.

19 Claims, 6 Drawing Sheets

U.S. PATENT DOCUMENTS

| | | | | |
|---|---|---|---|---|
| 7,436,804 | B2* | 10/2008 | O'Neill | 370/331 |
| 2002/0036983 | A1 | 3/2002 | Widegren et al. | |
| 2002/0126642 | A1 | 9/2002 | Shitama | |
| 2004/0071120 | A1* | 4/2004 | Grech | 370/338 |
| 2004/0100951 | A1* | 5/2004 | O'neill | 370/389 |

FOREIGN PATENT DOCUMENTS

| | | | |
|---|---|---|---|
| EP | 1032178 | A | 8/2000 |
| EP | 1182832 | A | 2/2002 |
| EP | 1182844 | A | 2/2002 |
| FR | 2812783 | A | 8/2002 |
| JP | 11234333 | A | 8/1999 |
| WO | WO 02/100038 | A | 12/2002 |

OTHER PUBLICATIONS

Takagi Y et al, "Mobile IP Route Optimization Method for Next-Generation Mobile Networks", Electronics & Communications in Japan, Part 1—Communications, Scripta Technica, New York, US, vol. 86, No. 2, Part 1, 2003, pp. 31-41, SP 001132374 ISSN: 8756-6621, p. 32/33, Fig. 2, "2 Mobile IP-Based Mobile Core Network Configuartion".

Xiaobao Chen, "Problem Statement for MIPv6 Interactions with GPRS/UMTS Packet Filtering; Internet Draft; draft-chen-mep6-gprs-00.txt", IETF MIP6 Working Group, Feb. 5, 2004, pp. 1-17, XP002284133.

International Search Report for PCT Application No. GB0226289.7, dated Apr. 28, 2003, 1 page.

International Search Report for PCT Application No. EP2007015464, dated Oct. 5, 2007, 3 pages.

Digital cellular telecommunications system (Phase 2+), Universal Mobile Telecommunications System (UMTS), End to end quality of service concept and architecture, 3GPP TS 23.207 v. 5.4.0 Release 5, Jun. 2002.

Chen, et al., MIPv6 Inter-working with Packet Filtering, IETF Mobile IP Working Group Internet-Draft, draft-chen-mobileip-packert-filtering-xc-00.txt, Feb. 2003.

Takagi, et al., Mobile IP Route Optimization Method for Next-Generation Mobile Networks, Electronics and Communications in Japan, Part 1, vol. 86, No. 2, 2003.

Chen, et al., Problem Statement for MIPv6 Interactions with GPRS/UMTS Packet Filtering, MIP6 WG Internet Draft, draft-chen-mip6-gprs-00.txt, Feb. 2004.

International Search Report for International Application No. PCT/GB03/04812.

* cited by examiner

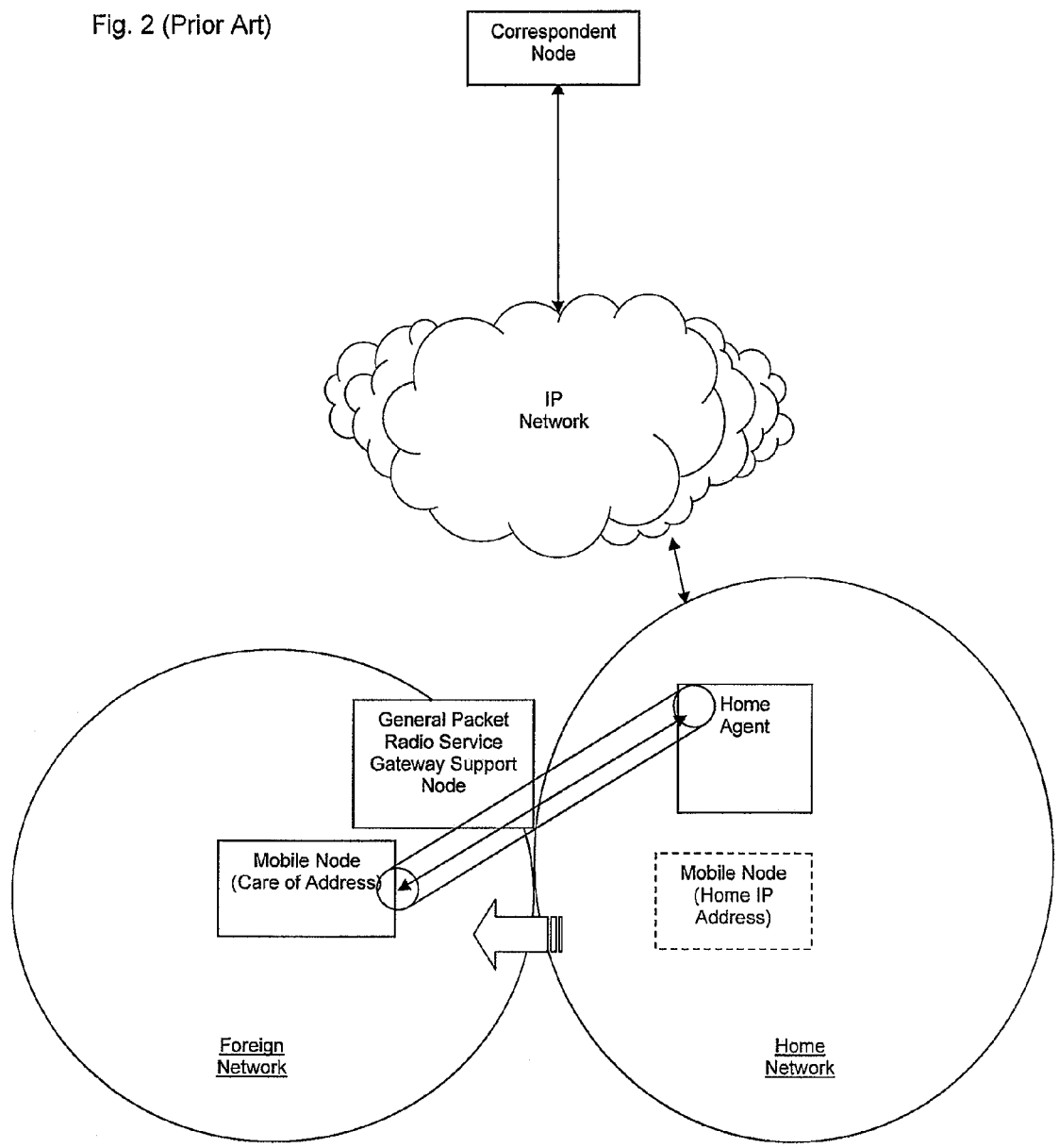

FILTERING DATA PACKETS AT A NETWORK GATEWAY WORKING AS A SERVICE-BASED POLICY (SBLP) ENFORCEMENT POINT

FIELD OF THE PRESENT INVENTION

The present invention relates to apparatus for and methods of enabling a gateway node of a packet-switched data network to maintain a destination address based packet filter when the packet header destination address changes during a session.

More particularly, but not exclusively, the present invention relates to apparatus for and methods of enabling a General Packet Radio Service Gateway Support Node (GGSN) of a 2G or 3G General Packet Radio Service (GPRS) network to apply Service-Based Local Policy (SBLP)-based gating functions based on the destination address of packets leaving or arriving at the GPRS network while supporting network roaming which may result in a change of the destination address during an IP session.

BACKGROUND

Whereas conventional 2G mobile networks, such as those conforming to the Global System for Mobile Communications (GSM) standards, have provided circuit-switched voice and data services to user's mobile stations (MSs), there is great momentum in the mobile telecommunications industry to deploy packet-switched mobile networks. Packet-switched mobile networks have significant advantages in terms of network and radio resource efficiency and also enable the provision of more advanced user services. With the convergence of fixed and mobile telecommunications networks, the Internet Protocol (IP), widespread in fixed networks, is the natural choice as the packet routing mechanism for mobile packet networks. Currently IP version 4 (IPv4) is in widespread use in the fixed network domain. However, it is expected gradually to migrate to IP version 6 (IPv6) which offers well-recognised benefits over IPv4, notably in terms of greatly increased address space, more efficient routing, greater scalability, improved security, Quality of Service (QoS) integration, support for multicasting and other features.

Particular examples of mobile packet-switched services currently being deployed include the General Packet Radio Service (GPRS) as implemented in both 2G GSM networks and in 3G Universal Mobile Telecommunications System (UMTS) networks (hereinafter referred to as GPRS networks). It is also expected that non-GPRS wireless access technologies, such as wireless Local Area Network (wLAN), will provide a flexible and cost-effective complement to GPRS for local broadband service access in some areas such as hotspots (conference centres, airports, exhibition centres, etc). Consequently mobile network operators will want to support roaming of mobile stations between GPRS and non-GPRS networks or subnetworks.

The reader is referred to the GPRS Service Description (release 1999) Technical Specification, referred to as 3G TS 23.060 v3.12.0 (2002-06) and available from the 3GPP website at http://www.3gpp.org/ftp/specs/2002-06/R1999/23_series/, which provides a detailed service description for 2G (GPRS/GSM) and 3G (GPRS/UMTS) mobile packet networks. The functionality of GPRS networks is also generally well-known, although further aspects will be described in detail below.

In order to access GPRS packet-switched services, a MS first performs a GPRS attach procedure with an SGSN (either a 2G GSM GPRS attach or a 3G UMTS GPRS attach). Authentication, and location updating procedures are performed, and, if successful, the GPRS attach procedure makes the MS available for paging via the SGSN and notification of incoming packet data. However, to actually send and receive packet data, the MS must have an allocated Packet Data Protocol (PDP) address (eg an IP address) and must activate at least one PDP context for use with that PDP address. Each PDP address for a MS may have one or more PDP contexts associated with it and data defining the PDP contexts is stored in the MS, the SGSN, and the GGSN. The process of PDP context activation makes the MS known not only to the SGSN, but also to the corresponding GGSN and inter-working with external data networks can commence.

While GPRS networks, having been designed from the start as mobile networks, have built-in mobility management (for MSs within the GPRS network) and roaming functionality (for MSs roaming between GPRS networks), work has also taken place in the Internet Engineering Task Force (IETF) to support mobility of IP user terminals in general. To this end, the IETF have developed the Mobile IP (MIP) protocols. MIP is designed to support mobility when mobile stations (or mobile nodes (MNs) in MIP terminology) move between IP networks with different subnet prefixes (macro-mobility). For example, MIP may be used to support mobility between a GPRS network and a non-GPRS network such as a wLAN network. Mobile IP is not expected to be used for mobility management within a network or subnetwork (micro-mobility) which is typically managed by access technology specific layer 2 mechanisms such as WCDMA softer/soft handover.

There are two versions of MIP to correspond to the two versions of IP. MIP version 4 (MIPv4) is designed to provide IP address mobility for IP version 4 (IPv4) addresses, whereas the newer MIP version 6 (MIPv6) MIP is designed to provide IP address mobility for IP version 6 (IPv6) addresses. MIPv4 is described in the IETF Request For Comment (RFC) 2002 available at the IETF website http://www.ietf.org/rfc/rfc2002.txt?number=2002. Internet draft MIPv6 is described in the IETF Internet draft "Mobility Support in IPv6" available at the time of writing on the IETF website at http://www.ietf.org.internet-drafts/drafts-ietf-mobileip-ipv6-19.txt and referenced as draft-ietf-mobileip-ipv6-19.txt, dated 29 Oct. 2002.

A scenario involving MIP roaming with routing optimisation is illustrated in FIG. 1. A MN is allocated a home IP address (HAddr) in its Home Network (HN). Routing procedures in the HN ensure that wherever the MN is within the HN, an IP packet sent from a Correspondent Node (CN) over an IP network will reach the MN. When the MN roams to a foreign network (FN), the MN is assigned a Care of Address (CoA) within the FN to which IP packets will need to be routed. However, the movement of the MN must be transparent to the IP layer and the upper layers (e.g. the transport layer and the application layer) during a session, so that packets created by the IP layer of the CN will continue to carry the HAddr as the destination address.

Under the MIPv6 routing optimisation protocol, the MN sends a binding update to the CN when roaming into the FN, to inform the CN of the CoA. The MIP layer of the CN then sets the destination address of subsequent packets in the session to the CoA, and places the MN's HAddr in a Routing Header Type 2 as the extension header of the packet. At the MN MIP layer, the HAddr is retrieved from the Routing Header Type 2 field and used as the destination address in the corresponding packet passed to the IP layer of the MN.

In this scenario, the CN is located in a GPRS network (GN) interfaced to the IP network via a General Packet Radio Service Gateway Support Node (GGSN), with functions as defined in the document 3GPP TS 23.207 V5.3.0 (March 2002), clause 5.2.1. The GGSN includes a Service-Based Local Policy (SBLP) enforcement point, which applies policy-based admission control to packets passing through the GGSN. Policy enforcement for an individual session is defined by a 'gate', with gates defined independently for upstream and downstream traffic. Each gate includes a packet classifier and actions to be taken for packets matching the packet classifier. The packet classifier includes source IP address, destination IP address, source port, destination port and protocol. The packet classifier source and destination IP addresses may include wildcards so as to define a range of addresses. Packets which do not match the packet classifier of the corresponding gate are blocked.

To set up an IP session through the GGSN, the CN sends to the GGSN an authorisation request specifying the source IP address, destination IP address (i.e. the HAddr), source port, destination port and protocol; An SBLP decision point within the GGSN (the local decision point), as defined in clause 5.2.3 of the document 3GPP TS 23.207 V5.3.0 (March 2002), or a Policy Control Function (PCF) outside the GGSN, determines whether to authorize the IP session. If the session is authorized, a gate is set up for each direction of the session at the SBLP enforcement point and an authorization token is transmitted to the CN. The authorization token conforms to the IETF Specification on SIP Extensions for Media Authorization.

An uplink SBLP may be used to prevent access by the CN (or other nodes within the GN) to specified destination IP addresses. Hence, a gate may only be authorised if the requested destination IP address is acceptable under the SBLP. However, such a gate will interfere with the MIPv6 routing optimisation protocol described above, because the destination address, as seen by the GGSN, changes from the HAddr to the CoA in mid session. Packets addressed to the CoA do not match the packet classifier of the uplink gate corresponding to the session, and may be blocked.

Route optimisation is mandatory in MIPv6, but optional in MIPv4. An alternative route without route optimisation is shown in FIG. 2. An IP session is set up between the CN and the MN in its HN. The MN roams into the FN during the session, and sends a binding update to inform a Home Agent (HA) in the HN of the CoA in the FN. In this example, the FN is a GPRS network connected to the IPN through a GGSN.

In response to the binding update, the HA sets up an IP tunnel to the CoA by intercepting any subsequent packets with the HAddr as the destination address and encapsulating them in packets with the IP address of the HA set as the source address and the CoA of the MN set as the destination address. The MIP layer of the MN decapsulates the packets and passes them to the IP layer so that the roaming is transparent to the IP layer and the upper layers. This tunnelling may be achieved using MIPv6 Generic Packet Tunnelling Mechanism described in ETF RFC 2473.

In the uplink direction, the MN may not need to change the source and destination address of its packets after roaming into the FN, because the IP address of the CN has not changed. However, the GGSN may apply an egress filter to outgoing packets, so that any packets with a source address not within the FN are blocked. This may be implemented by a SBLP gate with a packet classifier source address set to match any IP address within the GGSN. As a result, packets from the MN, bearing the HAddr as the source address, would be blocked.

To address this problem, the MIPv4 and MIPv6 standards include a reverse tunnelling protocol in which the MN sets up a tunnel in the uplink direction between its CoA and the HA address. Since the uplink packets are encapsulated in packets carrying the CoA as the source address, and the CoA is within the FN, the egress filter will allow the encapsulated packets to pass. The HA decapsulates the packets and forwards them to the CN. MIPv6 reverse tunnelling is described for example in the IETF Mobile IP Working Group Draft 'Mobility Support in IPv6', 29 Oct. 2002, located at the time of writing at http://www.ietf.org/internet-drafts/draft-ietf-mobileip-ipv6-19.txt However, this solution gives rise to a problem where the GGSN in the FN has implemented an SBLP gate for the uplink packets. When the MN enters the FN, it must send an authorization request to the GGSN to allow the IP session with the CN to be routed through the GGSN. This is not a problem in itself, because the authorization protocol allows for authorization in mid session, even when the session has begun outside the GGSN local network. However, the authorization request originated from the Application layer (e.g. SIP session Layer) will specify the HA address as the destination address, and the HA address does not identify the end destination address because the MN's mobility management (e.g. the use of COA) is transparent to the Application layer. To authorize an uplink SBLP gate on the basis of the HA address would defeat the object of the SBLP gate, as the SBLP enforcement point would then have no control over the final destination of the outgoing packets. Moreover, the GGSN is not permitted to examine the payload of the encapsulated packets to discover the final destination address, and may not even be able to do so if the payload is encrypted, for example using IPSec.

SUMMARY OF THE PRESENT INVENTION

According to one aspect of the present invention, there is provided a method of filtering data packets at a network gateway, the data packets having a header including a destination address and an extension header, the method comprising selectively blocking ones of the data packets where neither the destination address nor the extension header matches a predetermined address criterion.

According to another aspect of the present invention, there is provided a method of filtering data packets at a network gateway, the data packets having a header including a destination address, the method comprising selectively blocking ones of the data packets where the destination address does not meet a destination address criterion or a forwarding agent criterion which defines an address of at least one forwarding agent which forwards packets addressed to the forwarding agent to a destination node at a network address specified in the payload of the packet.

BRIEF DESCRIPTION OF DIAGRAMS

Specific embodiments of the present invention will now be described with reference to the accompanying drawings, in which:

FIG. 2 is a conceptual diagram illustrating a problem arising from attempting to apply an outgoing SBLP to a reverse tunnel;

DETAILED DESCRIPTION OF EMBODIMENTS OF THE PRESENT INVENTION

A first embodiment of the invention provides a first solution to the problem of applying SBLP-based gating functions where MIPv6 route optimisation is used in sub-network roaming, as described above with reference to FIG. 1. In MIPv6 route optimisation, the HAddr is stored in the Routing Header Type 2 extension header (T2H) so that it can be retrieved by the MN MIP layer and restored as the destination address in packets passed to the IP layer.

Figure 3A:
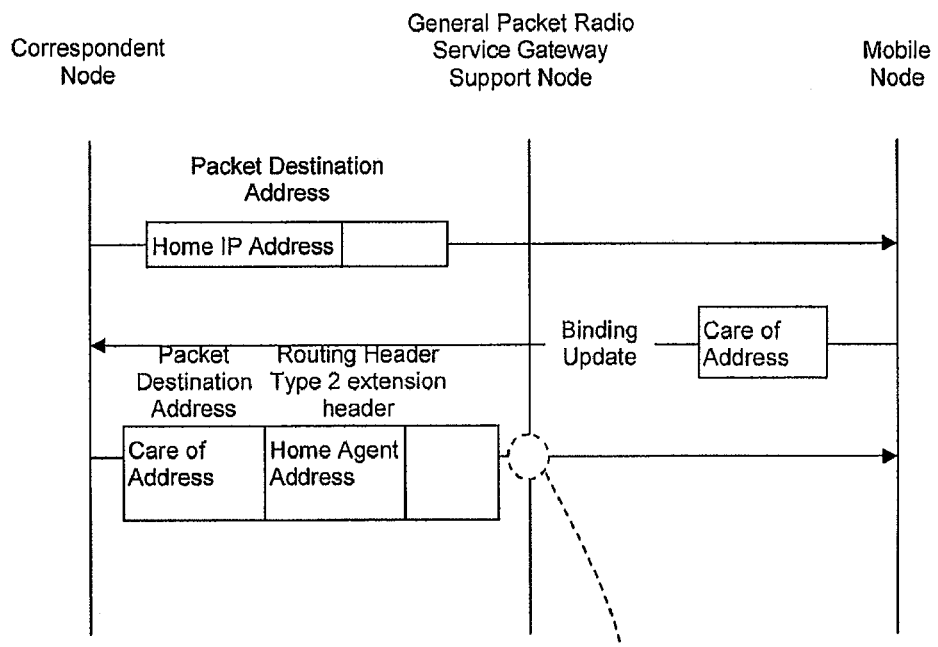
FIG. 3a is a signal diagram illustrating route optimisation in the scenario of FIG. 1.

As shown in FIG. 3a, packets sent from the CN to the MN during an IP session before the MN roams in the FN have the HAddr as their destination IP address (DA). When the MN roams into the FN, it sends a binding update (BU), including the CoA, to the CN. In accordance with the MIPv6 routing optimisation protocol, in response to the BU, the CN sends subsequent packets addressed to the CoA, with the HAddr in the T2H.

The present inventor has realised that the Routing Header Type 2 extension header could be inspected by the GGSN to identify the end destination address of the packet. The conventional packet classifier does not include a Routing Header Type 2 extension header IP address. However, SBLP protocols are local to their network, so that SBLP enforcement may be modified without raising problems of interoperability with other networks.

Figure 3B:
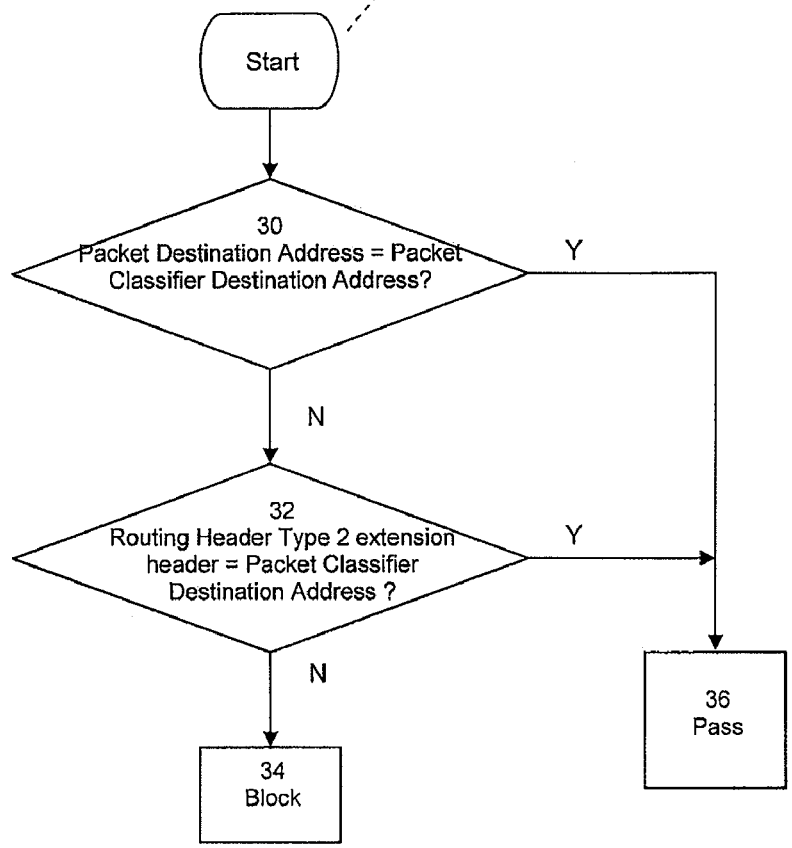
FIG. 3b is a flowchart of the operation of an SBLP enforcement point applying an outgoing SBLP gate in a first embodiment of the present invention.

In the first embodiment, as shown in FIG. 3b, a conventional packet classifier is created for an outgoing SBLP gate, including a packet classifier destination address PCD. The SBLP enforcement point implements the gate by comparing the packet classifier destination address PCD with the packet destination address PD (step 30) and the Routing Header Type 2 extension header (step 32). If neither matches, the packet is blocked (step 34), otherwise the packet is allowed to pass (step 36), subject to any other gate conditions.

The solution of the first embodiment is advantageous because it requires modification of only the SBLP enforcement point, and not the behaviour of the MN or the CN, or the creation of any new objects such as remote agents. A similar effect could be achieved by defining an extended packet classifier that specifies a Routing Header Type 2 extension header to be matched as an alternative to the destination IP address, but the Routing Header Type 2 extension header is redundant as we expect it to be the same as the HAddr in the packet classifier. The effect could be achieved by distributing the functionality differently among the objects internal to the GGSN.

Although the solution of inspecting the Routing Header Type 2 extension header is not prohibited by MIPv6, it may be considered to violate the intended purpose of the Routing Header Type 2 extension header, which is to restore the original destination address locally at the destination user equipment. If technical measures were to be implemented to prevent such a violation, this would frustrate the solution of the first embodiment.

Figure 4A:
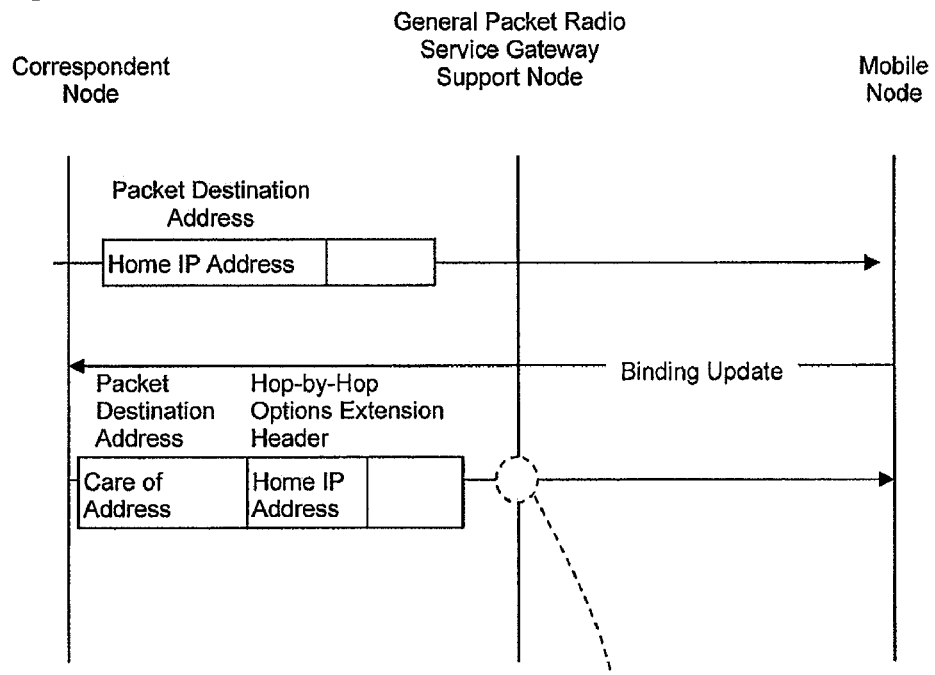
FIG. 4a is a signal diagram illustrating a second embodiment of the invention, for solving the problem illustrated in FIG. 1.

In a second embodiment, as illustrated in FIG. 4a, the end destination address (HAddr) is stored in a hop-by-hop options extension header HH of outgoing packets. Both IPv4 and IPv6 allow a hop-by-hop options extensions header, which is must be read by intermediate nodes. The existence of the IPv6 Hop-by-Hop Options extension header is indicated by placing a zero in the IPv6 Next Header field.

In response to the BU sent by the MN to the CN, the CN stores the HAddr in the HH of subsequent packets. This action is performed in addition to the storage of the HAddr in the Type 2 header and the CoA in the destination IP address field.

Figure 4B:
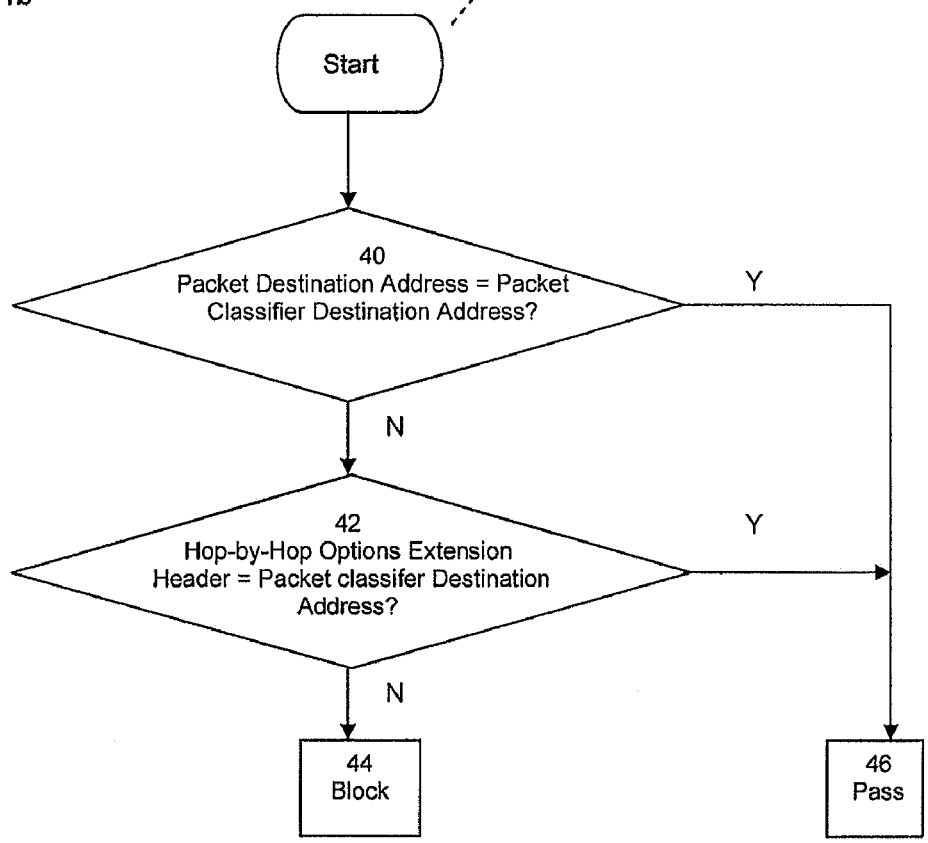
FIG. 4b is a flowchart of the operation of an SBLP enforcement point applying an outgoing SBLP gate in the second embodiment.

As shown in FIG. 4b, the SBLP enforcement point compares the packet classifier destination address PCD to the packet destination address PD (step 40), and also to any IP addresses in the HH (step 42). If neither matches, the packet is blocked (step 44). Otherwise, the packet is allowed to pass (step 46), subject to any other restrictions.

The second embodiment is preferable to the first embodiment in that the GGSN only inspects fields which it is allowed to inspect, and one can therefore be confident that technical measures will not be introduced which would frustrate the solution of the second embodiment. However, the second embodiment requires a change in the behaviour of the MN that complies with specifications of existing MIPv6 Internet Draft, while the first embodiment does not.

A third embodiment provides a first solution to the problem of applying an SBLP outgoing gate on a reverse tunnel, as described above with reference to FIG. 2. The reverse tunnel hides the CN address in the payload, which may be encrypted. Instead, the third embodiment employs a similar solution to that of the second embodiment.

Figure 5A:
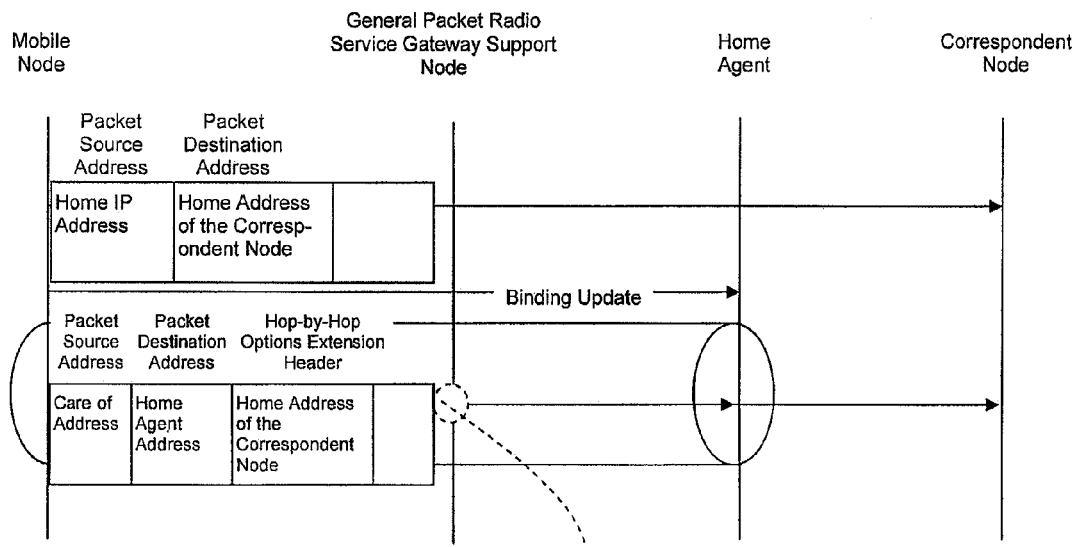
FIG. 5a is a signal diagram of a third embodiment of the invention, for solving the problem illustrated in FIG. 2.

As shown in FIG. 5a, in an IP session the MN initially sends packets to the CN with the packet source address PS set to the HAddr and the PD set to the CN address (CNAddr). When the MN roams into the FN, it sends a BU to its HA and then sets up a reverse IP tunnel between its CoA and the HA at the HA address (HAAddr).

Figure 5B:
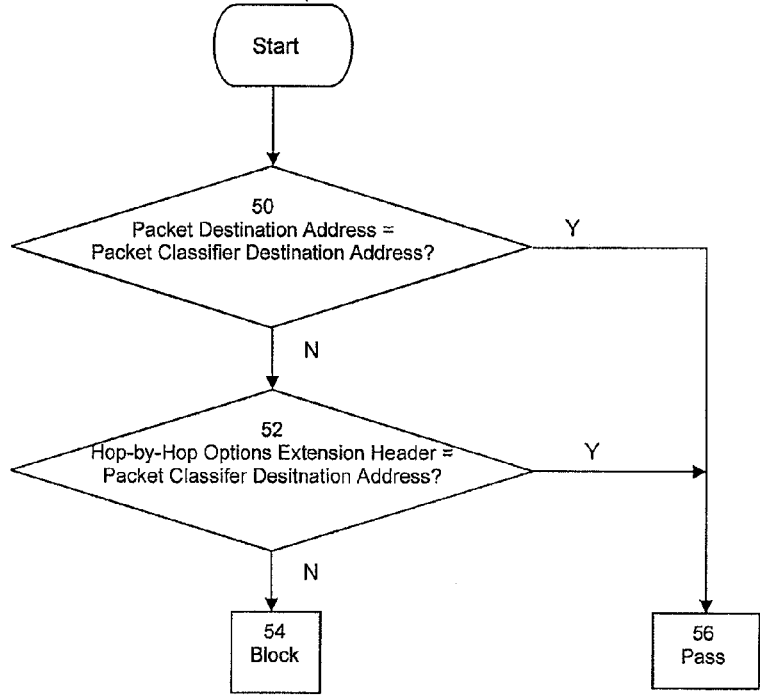
FIG. 5b is a flowchart of the operation of an SBLP enforcement point applying an outgoing SBLP gate, in the third embodiment.

In this embodiment, the MN includes the CNAddr (or the Home Address of the CN in case the CN itself is a mobile and away from its home network using Mobile IPv6 for mobility) in the HH of the reverse tunnelling packets. As shown in FIG. 5b, the SBLP enforcement point compares the packet classifier destination address PCD to the packet destination IP address PD (Step 50), and also to any IP addresses in the HH (step 52). If neither matches, the packet is blocked (step 54). Otherwise, the packet is allowed to pass (step 56), subject to any other restrictions.

The third embodiment requires additional functionality at the CN to that already required for reverse tunnelling. A fourth embodiment provides a second solution to the problem of applying an SBLP outgoing gate on a reverse tunnel, which does not require such additional functionality.

Figure 6:
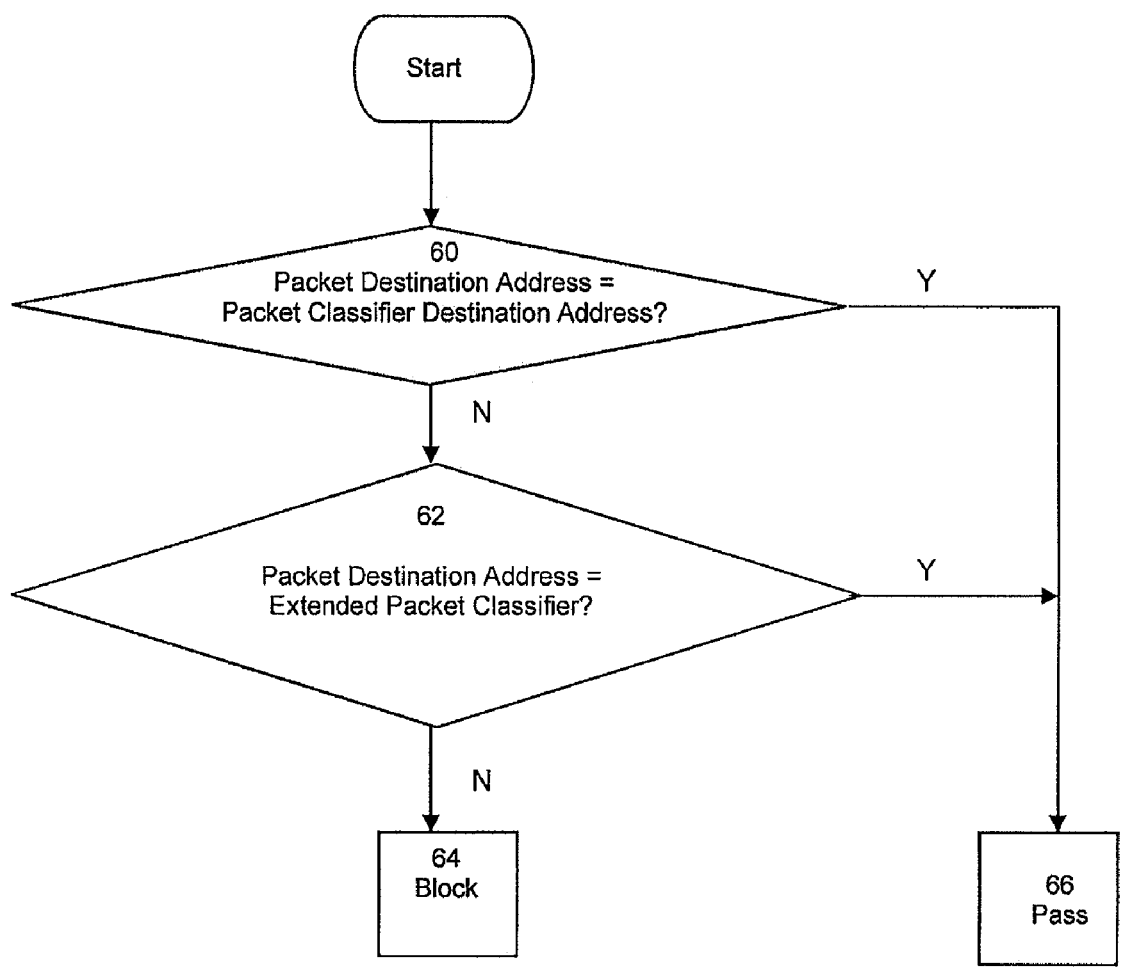
FIG. 6 is a flowchart of the operation of an SBLP enforcement point applying an outgoing SBLP gate, in a fourth embodiment of the present invention.

In the fourth embodiment, an extended packet classifier PCHA is defined which includes the HA IP address. As shown in FIG. 6, the SBLP enforcement point compares the packet destination address PD with the packet classifier destination address PCD (step 60) and with the packet classifier HA address PCHA (step 62). If neither matches, the packet is blocked (step 64). Otherwise, the packet is allowed to pass (step 66), subject to any other restrictions.

As explained above, this may result in the effect of the SBLP being negated, unless there exists a trust or control relationship between the GGSN and the HA.

As an example of a control relationship, the GGSN of the FN and the HA of the HN may have access to a common SBLP decision point, which issues authorisations to SBLP enforcement points in the FN and the HN based on a common policy. Alternatively, to reduce authorisation traffic between the FN and HN, the SBLP decision point may be replicated between the FN and the HN, for example by sharing lists of blocked IP addresses.

As an example of a trust relationship, the SBLP decision point of the GGSN may store a list of IP addresses of trusted HA, and authorise gates with packet classifiers containing a HA address present on the list. The GGSN does not have any control over the SBLP of the HA, but trusts it to maintain an SBLP which conforms with its own SBLP. The trust relationship may be revoked by removing the HA address from the list of trusted addresses.

Figure 1:
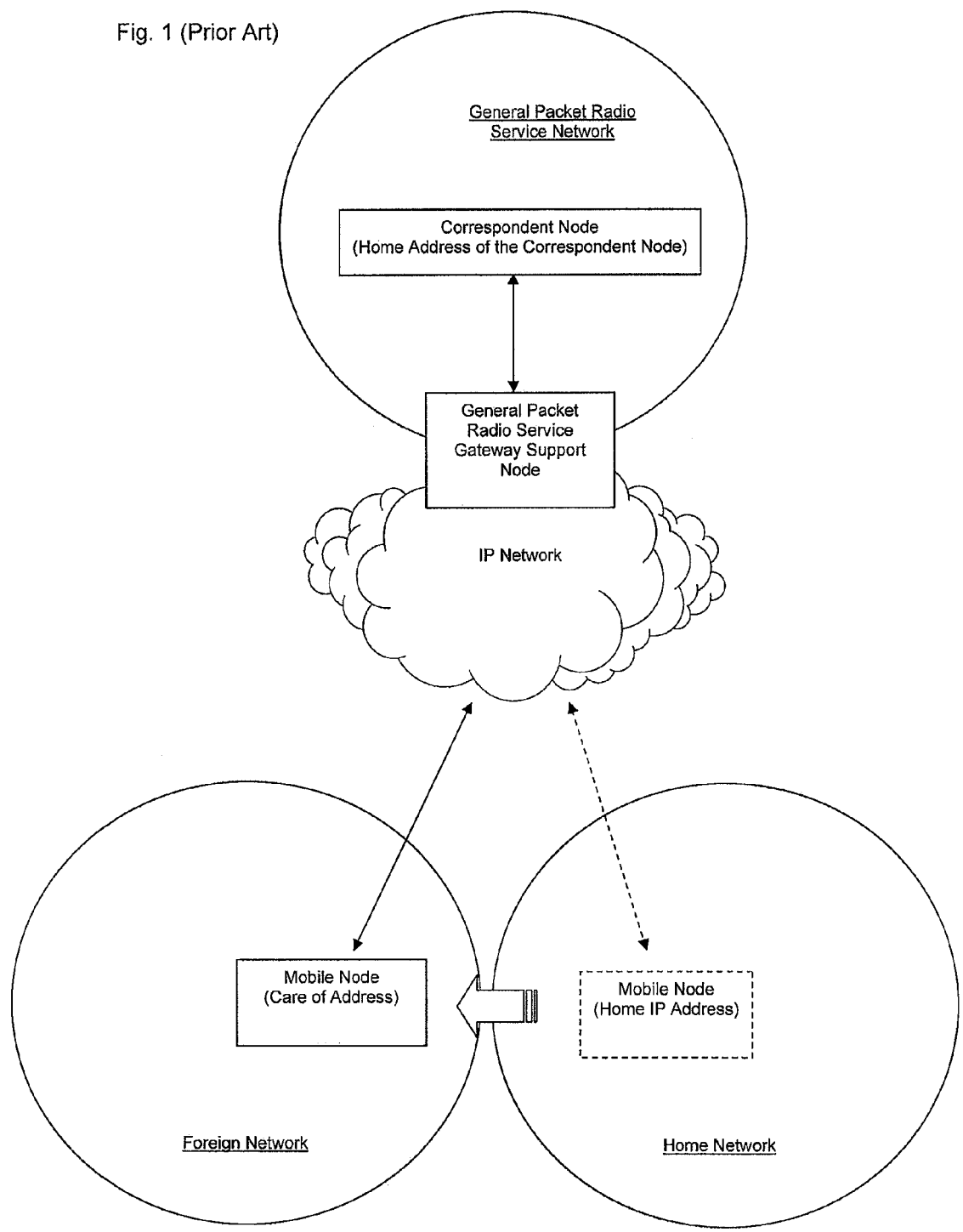
FIG. 1 is a diagram illustrating a problem arising from attempting to apply an outgoing SBLP in a GGSN where the destination node is roaming using route optimization.

While the above embodiments have been described with reference to an SBLP in a GPRS network, it will be understood that a destination address-based packet filter may be needed in other contexts, such as firewalls in local IP networks, which need not be wireless networks. In the scenario of FIG. 1, the CN could be a node within the local IP network. The apparent change in destination address could arise in contexts other than MIPv6 route optimisation. For example, IP forwarding arrangements may require the destination address as set by the transmitting node to be changed in mid session, so as to transfer the session to another physical device. Variants of the first and second embodiments may be applicable to these alternative contexts.

Likewise, a reverse tunnelling arrangement may arise in contexts other than roaming in mobile IP, and variants of the third and fourth embodiments may be applicable to these alternative contexts.

While the above embodiments describe a destination-based filter applied in to outgoing packets in a gateway of a network that is local to the transmitting node, the destination-based filter could be applied to incoming packets in a gateway of a remote network to the transmitting node. In the second and third embodiments, this will require standardization between the local and remote networks to ensure that the destination address is placed in the HH by the transmitting node.

In the first to third embodiments, it is not essential that the SBLP enforcement point check both the packet destination address and the extension header at all times; instead, the gate may initially only check the packet destination address, and the gate may be changed in response to roaming event so as to check only the extension header.

Some embodiments include a computer readable medium including a program for executing a method of filtering data packets at a network gateway, the data packets having a header including a destination address and an extension header, the method comprising selectively blocking ones of the data packets where neither the destination address nor the extension header matches a predetermined address criterion.

The above embodiments are provided only by way of example and modifications or variants thereof may also fall within the scope of the invention.

The invention claimed is:

1. A method of filtering at a network gateway data packets of a packet data communication session between a source and a destination node, the data packets having a header including a destination address and an extension header, the method comprising:

selectively blocking at the network gateway, ones of the data packets where neither the destination address nor the extension header matches a predetermined address criterion, wherein the destination node has a first network address during a first period of the packet data communication session and a second, different network address during a second, subsequent period of the data communication session, and the source node transmits packets having the first network address as the destination address during the first period, transmits packets having the second network address as the destination address and the first network address in the extension header during the second period.

2. The method of claim 1, wherein the address criterion is applied only to packets transmitted from a source node to a destination node during a corresponding packet data communication session.

3. The method of claim 1, wherein the destination node converts packets received during the second period by replacing the second network address with the first network address before decoding the payload of the packets.

4. The method of claim 1, wherein the extension header is a Routing Header Type 2 extension header.

5. The method of claim 1, wherein the destination node roams from a first network including the first network address to a second network including the second network address between the first and second periods.

6. The method of claim 2, wherein the source node has a first network address during a first period of the packet data communication session and a second, different network address during a second, subsequent period of the data communication session, the packets include a source address, and the source node transmits, during the first period, packets having the first network address as the source address and the address of the destination node as the destination address and transmits, during the second period, packets having the second network address as the source address, the address of the destination node in the extension header and, as the destination address, the address of a forwarding agent which forwards the packets to the destination node.

7. The method of claim 6, wherein a payload of the packets transmitted by the source node during the second period contains the address of the destination node.

8. The method of claim 6, wherein the source node roams from a first network including the first network address to a second network including the second network address between the first and second periods.

9. The method of claim 1, wherein one or more intermediate nodes, through which the packets are routed between the source node and the destination node, read information in the extension header.

10. The method of claim 9, wherein the extension header is a Hop-by-Hop Options extension header.

11. A method of filtering at a network gateway data packets of a packet data communication session between a source node and a destination node, the data packets having a header including a destination address, the method comprising:

selectively blocking by the network gateway ones of the data packets where the destination address does not meet a destination address criterion and does not meet a forwarding agent criterion which defines an address of at least one forwarding agent which forwards packets addressed to the forwarding agent to the destination node at a network address specified in the payload of the packet, wherein the destination node has a first network address during a first period of the packet data communication session and a second, different network address during a second, subsequent period of the data communication session, and the source node transmits packets having the first network address as the destination address during the first period, and transmits packets having the second network address as the destination address and the first network address in the extension header during the second period.

12. The method of claim 11, wherein the at least one forwarding agent blocks packets for which the network address does not meet the destination address criterion.

13. The method of claim 11, wherein the forwarding agent criterion is variable so as to include or exclude an address of the at least one forwarding agent.

14. A method of transmitting data packets in a source node of a packet data network, comprising:
  establishing a packet data communication session with a destination node at a first network address via a network gateway such that the gateway applies a filter to the data packets of the communication session based on a destination address of the data packets, wherein the filter selectively blocks ones of the data packets where neither an address nor an extension header of the destination node matches a predetermined address criterion;
  receiving an indication of a second network address of the destination node during the session; and
  transmitting subsequent packets within the session addressed to the second network address and containing the first network address in an extension header for containing information to be read by intermediate nodes between the source node and the destination node,
  wherein the destination node has the first network address during a first period of data communication session and the second, different network address during a second, subsequent period of the data communication session, and the source node transmits packets having the first network address as the destination address during the first period, and transmits packets having the second network address as the destination address and the first network address in the extension header during the second period.

15. A method of applying a destination address based filter at a network gateway to a packet data communication session between a source node and a destination node, wherein the destination node roams from a home address in a home network to a care-of address in a foreign network and sends a binding update to the source node so that the source node addresses subsequent packets in the session to the care-of address and places the home address in an extension header of the subsequent packets, the method comprising:
  applying by the gateway the destination address-based packet filter to the extension header of the subsequent packets, wherein the filter selectively blocks ones of the data packets where neither an address nor an extension header of the destination node matches a predetermined address criterion, and wherein the extension header is used by the destination node to restore the home address as the destination address of the subsequent packets, wherein the destination node has a first network address during a first period of the packet data communication session and a second, different network address during a second, subsequent period of the data communication session, and the source node transmits packets having the first network address as the destination address during the first period, and transmits packets having the second network address as the destination address and the first network address in the extension header during the second period.

16. The method of claim 15, wherein the extension header is read by intermediate nodes between the source node and the destination node.

17. A method of applying a destination address based packet filter at a network gateway to a packet data communication session between a source node and a destination node, wherein the source node roams from a home address in a home network to a care-of address in a foreign network having said network gateway, and sets up a reverse tunnel to a home agent in the home network for forwarding packets to the destination node, wherein the source node places the address of the destination node in an extension header of packets sent from the foreign network, the method comprising:
  applying the destination address filter to the extension header of the packets, wherein the filter selectively blocks ones of the data packets where neither an address nor an extension header of the destination node matches a predetermined address criterion, and wherein the destination node has a first network address during a first period of the packet data communication session and a second, different network address during a second, subsequent period of the data communication session, and the source node transmits packets having the first network address as the destination address during the first period, and transmits packets having the second network address as the destination address and the first network address in the extension header during the second period.

18. A computer readable medium encoded with computer executable instructions which are executed by the computer to perform a method of filtering data packets at a network gateway, the data packets having a header including a destination address and an extension header, the method comprising:
  selectively blocking ones of the data packets where neither the destination address nor the extension header matches a predetermined address criterion, wherein the destination node has a first network address during a first period of the packet data communication session and a second, different network address during a second, subsequent period of the data communication session, and the source node transmits packets having the first network address as the destination address during the first period, and transmits packets having the second network address as the destination address and the first network address in the extension header during the second period.

19. An apparatus configured to filter data packets at a network gateway, the data packets having a header including a destination address and an extension header, the apparatus comprising:
  a filter is configured to selectively block ones of the data packets when neither the destination address nor the extension header matches a predetermined address criterion, wherein the destination node has a first network address during a first period of the packet data communication session and a second, different network address during a second, subsequent period of the data communication session and the source node transmits packets having the first network address as the destination address during the first period, and transmits packets having the second network address~as the destination address and the first network address in the extension header during the second period.

* * * * *